US011068348B2

(12) United States Patent
Chen

(10) Patent No.: US 11,068,348 B2
(45) Date of Patent: Jul. 20, 2021

(54) METHOD AND ENABLE APPARATUS FOR STARTING PHYSICAL DEVICE

(71) Applicant: Huawei Technologies Co., Ltd., Shenzhen (CN)

(72) Inventor: Ben Chen, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 175 days.

(21) Appl. No.: 16/263,800

(22) Filed: Jan. 31, 2019

(65) Prior Publication Data

US 2019/0163573 A1 May 30, 2019

Related U.S. Application Data

(63) Continuation of application No. PCT/CN2016/104050, filed on Oct. 31, 2016.

(51) Int. Cl.
*G06F 11/00* (2006.01)
*G06F 11/14* (2006.01)
*G06F 11/20* (2006.01)
*G06F 11/07* (2006.01)
(Continued)

(52) U.S. Cl.
CPC ........ *G06F 11/1417* (2013.01); *G06F 9/4405* (2013.01); *G06F 9/5072* (2013.01); *G06F 11/079* (2013.01); *G06F 11/0721* (2013.01); *G06F 11/0724* (2013.01);
(Continued)

(58) Field of Classification Search
CPC ............. G06F 11/0724; G06F 11/1417; G06F 11/1428; G06F 11/2041
See application file for complete search history.

(56) References Cited

U.S. PATENT DOCUMENTS

2011/0154106 A1* 6/2011 Kelly .................. G06F 11/2025
714/10
2012/0173922 A1* 7/2012 Cheng ................. G06F 11/2025
714/13
(Continued)

FOREIGN PATENT DOCUMENTS

CN 101216793 A 7/2008
CN 101656681 A 2/2010
(Continued)

OTHER PUBLICATIONS

Google Scholar/Patents—text refined (Year: 2020).*
(Continued)

*Primary Examiner* — Christopher S McCarthy
(74) *Attorney, Agent, or Firm* — Conley Rose, P.C.

(57) ABSTRACT

This application discloses a method and an enable apparatus for starting a physical device, where the physical device includes N central processing units (CPUs) and at least one platform controller hub (PCH), N is greater than one. Each of the N CPUs is electrically coupled to a PCH in the at least one PCH. The method includes determining a second CPU in the N CPUs as the primary CPU when a fault occurs in a first CPU, where the first CPU is the primary CPU configured to start the physical device before the fault occurs in the first CPU, and triggering the second CPU as the primary CPU and in cooperation with a first PCH to start the physical device, where the first PCH is one PCH in the at least one PCH.

20 Claims, 7 Drawing Sheets

(51) Int. Cl.
*G06F 9/4401* (2018.01)
*G06F 9/50* (2006.01)

(52) U.S. Cl.
CPC ...... *G06F 11/0793* (2013.01); *G06F 11/1438* (2013.01); *G06F 11/2023* (2013.01)

(56) References Cited

U.S. PATENT DOCUMENTS

| | | | |
|---|---|---|---|
| 2014/0164827 A1* | 6/2014 | Swanson | G06F 11/2035 714/10 |
| 2014/0229707 A1 | 8/2014 | Futami | |
| 2014/0297922 A1 | 10/2014 | Sarangdhar et al. | |
| 2015/0205676 A1* | 7/2015 | Zheng | G06F 9/4406 714/15 |
| 2018/0039546 A1* | 2/2018 | Lambert | G06F 11/1417 |
| 2019/0188081 A1* | 6/2019 | Gao | G06F 11/1417 |

FOREIGN PATENT DOCUMENTS

| | | |
|---|---|---|
| CN | 103733180 A | 4/2014 |
| CN | 104579802 A | 4/2015 |
| CN | 105009086 A | 10/2015 |
| CN | 105446833 A | 3/2016 |
| CN | 105718333 A | 6/2016 |
| GB | 2351820 A | 1/2001 |

OTHER PUBLICATIONS

Google Patents/Scholar—text refined (Year: 2021).*
Machine Translation and Abstract of Chinese Publication No. CN101656681, Feb. 24, 2010, 14 pages.
Machine Translation and Abstract of Chinese Publication No. CN105009086, Oct. 28, 2015, 3 pages.
Machine Translation and Abstract of Chinese Publication No. CN105446833, Mar. 30, 2016, 16 pages.
Foreign Communication From a Counterpart Application, Chinese Application No. 201680003757.3, Chinese Office Action dated Mar. 20, 2019, 9 pages.
Machine Translation and Abstract of Chinese Publication No. CN101216793, Jul. 9, 2008, 13 pages.
Machine Translation and Abstract of Chinese Publication No. CN104579802, Apr. 29, 2015, 6 pages.
Machine Translation and Abstract of Chinese Publication No. CN105718333, Jun. 29, 2016, 9 pages.
Foreign Communication From a Counterpart Application, PCT Application No. PCT/CN2016/104050, English Translation of International Search Report dated May 3, 2017, 2 pages.
Foreign Communication From a Counterpart Application, Chinese Application No. 16920182.9, Extended European Search Report dated Jun. 7, 2019, 10 pages.

* cited by examiner

METHOD AND ENABLE APPARATUS FOR STARTING PHYSICAL DEVICE

CROSS-REFERENCE TO RELATED APPLICATION

This application is a continuation of International Patent Application No. PCT/CN2016/104050 filed on Oct. 31, 2016, which is hereby incorporated by reference in its entirety.

TECHNICAL FIELD

Embodiments of the present application relate to the processor field, and in particular, to a method and an enable apparatus for starting a physical device.

BACKGROUND

A physical device (for example, a server) has multiple central processing units (CPUs). Multiple CPUs in the physical device may be connected using a cache coherence bus. The cache coherence bus may be a quickpath interconnect (QPI) bus. One CPU of the multiple CPUs in the physical device is a primary CPU. The primary CPU establishes communication connections between the multiple CPUs when starting the physical device. In addition, the primary CPU may assign work to the multiple CPUs after starting the physical device.

In the other approaches, a physical device has only one platform controller hub (PCH). In addition, the PCH is electrically connected to a primary CPU only. For example, a physical device that includes four CPUs shown in FIG. 1A and a physical device that includes eight CPUs shown in FIG. 1B each have only one PCH. The PCH is connected to a CPU 0 only, and the CPU 0 is the primary CPU.

FIG. 1A is used as an example. In an initial phase of starting the physical device, the CPU 0 cooperates with the PCH, and establishes communication connections between four CPUs (the CPU 0, a CPU 1, a CPU 2, and a CPU 3) using a resource in the PCH. If a fault occurs in the CPU 0, the communication connections between the four CPUs cannot be established. Accordingly, the CPU 1, the CPU 2, and the CPU 3 cannot read a basic input/output system (BIOS) program in a flash memory by successively using the CPU 0 and the PCH, let alone execute the BIOS program to start the physical device. Therefore, starting of the physical device fails.

SUMMARY

In view of this, this application provides a method and an enable apparatus for starting a physical device in order to prevent the physical device from failing to start because a fault occurs in a current primary CPU.

According to a first aspect, this application provides a method for starting a physical device.

The physical device has M CPUs, where M is a positive integer greater than or equal to 2. N CPUs of the M CPUs belong to a CPU set, where M is greater than or equal to N, and N is a positive integer greater than or equal to 2. Each CPU in the CPU set is electrically connected to one PCH. In this way, any CPU may be selected from the CPU set as a primary CPU, and the primary CPU starts the physical device in cooperation with a PCH.

It should be learned that a scenario of selecting the primary CPU from the CPU set is not limited in this application. For example, the primary CPU may be switched when no fault occurs in the primary CPU, and the physical device restarts. For another example, the primary CPU is switched when a fault occurs in the primary CPU, and the physical device restarts.

Further, a fault occurs in a first CPU. The first CPU is a CPU in the CPU set, and the first CPU is a primary CPU that is configured to start the physical device before a fault occurs in the first CPU. After it is determined that a fault occurs in the first CPU, a second CPU is determined from the CPU set as the primary CPU. The second CPU is a CPU in the CPU set, and the second CPU is a CPU different from the first CPU. In this way, the primary CPU is switched when a fault occurs in the primary CPU.

After the second CPU is determined as the primary CPU, the second CPU is triggered as the primary CPU and in cooperation with a first PCH to start the physical device, where the first PCH is electrically connected to the second CPU. In this way, after a fault occurs in the first CPU, the second CPU may start the physical device by functioning as a new primary CPU and in cooperation with the first PCH. This effectively ensures that the physical device can restart.

In a possible design, even if no fault occurs in the primary CPU, when a preset condition is met, the physical device may restart and another CPU may be selected from the CPU set as the primary CPU. The preset condition may be a preset time, a restart signal triggered by a person by operating a component, or another preset condition. For example, a physical button is disposed on the physical device, and the physical button (a component that can be operated manually) may be pressed manually to trigger an electrical signal. The electrical signal is used to trigger a complex programmable logic device (CPLD) in the enable apparatus to send an enable signal to a CPU specified by the electrical signal. The enable signal is used to specify a new CPU. In this way, when the preset condition is met, the primary CPU may be switched, and the new primary CPU starts the physical device in cooperation with the PCH.

In a possible design, an alternative CPU set includes all CPUs in the CPU set except the first CPU. After it is determined that a fault occurs in the first CPU, a CPU is selected at random from the alternative CPU set as the second CPU. In this way, it may be ensured that a reselected primary CPU is a CPU in which no fault occurs.

In a possible design, if the alternative CPU set includes one CPU, the CPU is the second CPU. It can be learned that the CPU set may include only the first CPU and the second CPU. When a fault occurs in the first CPU, the second CPU is selected as the primary CPU.

In a possible design, if the alternative CPU set includes P CPUs, a CPU is determined from the P CPUs as the second CPU, where P is a positive integer greater than 1. It can be learned that the alternative CPU set includes more than one CPU. When a fault occurs in the first CPU, a CPU may be selected from the P CPUs as the primary CPU.

In a possible design, the alternative CPU set includes P CPUs, where P is a positive integer greater than 1. The second CPU is selected in the following manner If a first hop count is less than or equal to a second hop count, it is determined that a third CPU is the second CPU.

The physical device has M CPUs, M is a positive integer greater than or equal to N, and the M CPUs include the N CPUs. There are Q electrical connections between the M CPUs, and Q is a positive integer. Further, any one of the M CPUs is electrically connected to at least one CPU of other CPUs of the M CPUs. A first topology includes M nodes and Q links, the M CPUs are in a one-to-one correspondence with the M nodes, the Q links are in a one-to-one correspondence with the Q electrical connections. The first hop count is a sum of hop counts included in shortest paths using which all CPUs of the M CPUs except the first CPU and the third CPU connect to the third CPU according to the first topology. The second hop count is a sum of hop counts included in shortest paths using which all CPUs of the M CPUs except the first CPU and a fourth CPU connect to the fourth CPU according to the first topology. The fourth CPU is any one of the P CPUs included in the alternative CPU set except the third CPU.

In this possible design, based on a CPU topology, the selected second CPU functions as the primary CPU. Impact on a CPU is minimized when the second CPU functions as the primary CPU to start the physical device or run the physical device. In addition, efficiency of each CPU is further ensured when the second CPU functions as the primary CPU.

In a possible design, the alternative CPU set includes P CPUs. The second CPU is selected in the following manner. If the P CPUs in the alternative CPU set form a serial link, a CPU corresponding to an intermediate node in the serial link is determined as the second CPU.

The serial link includes P nodes and P−1 sub-links. The P CPUs are in a one-to-one correspondence with the P nodes. There are P−1 electrical connections between the P CPUs. Further, any one of the P CPUs is electrically connected to at least one CPU of other CPUs of the P CPUs, and the P−1 electrical connections are in a one-to-one correspondence with the P−1 sub-links.

In this possible design, based on the serial link CPU topology, the selected second CPU functions as the primary CPU. Impact on the CPU topology is minimized when the second CPU functions as the primary CPU to start the physical device or run the physical device. In addition, efficiency of each CPU is further ensured when the second CPU functions as the primary CPU.

In a possible design, after determining the second CPU as the primary CPU, the enable apparatus determines a PCH that is electrically connected to the second CPU as the first PCH, and instructs the first PCH to work.

In a possible design, after determining that a fault occurs in the first CPU, the enable apparatus forbids the first CPU to participate in starting of the physical device. In this way, the first CPU is prevented from affecting the starting of the physical device.

Optionally, the enable apparatus forbids, from an electrical perspective, the first CPU to participate in starting of the physical device. For example, the enable apparatus disconnects power supply from the first CPU.

Optionally, if a communication connection between the first CPU and another CPU is established in a process of starting the physical device, the enable apparatus forbids, from a communication perspective, the first CPU to participate in starting of the physical device. For example, the enable apparatus disconnects the communication connection between the first CPU and the other CPU.

In a possible design, the physical device includes a first memory, and the first memory stores a BIOS program used for starting the physical device.

In a process in which the second CPU starts the physical device in cooperation with the first PCH, the second CPU accesses the first memory using the first PCH in order to execute the BIOS program.

In a possible design, the physical device further includes a data selector. The data selector is electrically connected to each of the N CPUs in the CPU set. In addition, the data selector is electrically connected to the first PCH.

Before triggering the second CPU as the primary CPU and in cooperation with the first PCH to start the physical device, the enable apparatus instructs the data selector to establish a communication connection between the second CPU and the first PCH. Based on the communication connection between the second CPU and the first PCH, the second CPU can function as the primary CPU to access the first PCH, and start the physical device in cooperation with the first PCH.

Optionally, the enable apparatus instructs the data selector not to establish a communication connection between a CPU in the CPU set other than the second CPU and the first PCH. In this way, another CPU is prevented from accessing the first PCH at the same time in order to protect the cooperation between the second CPU and the first PCH from being affected.

In a possible design, the data selector is communicatively connected to the second CPU based on a first bus protocol, and the data selector is communicatively connected to the first PCH based on a second bus protocol. The first bus protocol and the second bus protocol are different bus protocols. Therefore, all data transmitted between the second CPU and the first PCH needs to be converted and forwarded by the data selector.

When the data selector forwards data that is sent by the second CPU to the first PCH, the data selector converts the data that is received from the second CPU and that conforms to the first bus protocol into data that conforms to the second bus protocol, and sends the data that conforms to the second bus protocol to the first PCH.

When the data selector forwards data that is sent by the first PCH to the second CPU, the data selector converts the data that is received from the first PCH and that conforms to the second bus protocol into data that conforms to the first bus protocol, and sends the data that conforms to the first bus protocol to the second CPU.

In a possible design, the physical device has N PCHs. There are N electrical connections between the N CPUs in the CPU set and the N PCHs, the N CPUs are in a one-to-one correspondence with the N PCHs, and the second CPU is electrically connected to the first PCH. In this way, each CPU in the CPU set exclusively occupies one PCH. Even if there is a faulty PCH, a CPU (that is, the second CPU) that is electrically connected to a PCH that is not faulty may be selected as the primary CPU.

In a possible design, the physical device includes N memories, there are N electrical connections between the N memories and the N PCHs, the N memories are in a one-to-one correspondence with the N PCHs, and the first memory is a memory that is of the N memories and that is connected to the first PCH. In this way, each CPU in the CPU set exclusively occupies one memory. For example, the second CPU exclusively occupies the first memory using the first PCH.

Optionally, different memories of the N memories may store different BIOS programs. When starting the physical device at different time, the primary CPU may be different CPUs in the alternative CPU set. Different CPUs execute different BIOS programs to start the physical device in order to perform differentiated configuration on the physical device according to different requirements.

Optionally, different memories of the N memories may store a same BIOS program. When starting the physical device at different time, the primary CPU may be different CPUs in the alternative CPU set. Different CPUs execute the same BIOS program to start the physical device, thereby ensuring consistency of configuration at each time of starting the physical device.

In a possible design, the physical device has multiple PCHs. The physical device includes a chip selector, the chip selector is electrically connected to the multiple PCHs, and the chip selector is electrically connected to the memory.

Before triggering the second CPU as the primary CPU and in cooperation with the first PCH to start the physical device, the enable apparatus instructs the chip selector to establish an electrical connection between the first PCH and the first memory. Based on the electrical connection between the first PCH and the first memory, the first PCH establishes a communication connection to the first memory using the chip selector such that the second CPU accesses the first memory using the first PCH in order to read the BIOS program in the first memory.

Optionally, the enable apparatus instructs the data selector not to establish an electrical connection between a PCH of the multiple PCHs other than the first PCH and the first memory. In this way, accessing the first memory by the first PCH may be prevented from being affected by another PCH.

In a possible design, the enable apparatus deployed in the physical device executes the method for starting a physical device provided in the first aspect or various possible designs of the first aspect.

According to a second aspect, this application provides an enable apparatus for starting a physical device, where the enable apparatus includes functional units that implement the method for starting a physical device provided in the first aspect or various possible designs of the first aspect.

According to a third aspect, this application provides a baseboard management controller (BMC), in which functional units that implement the method for starting a physical device provided in the first aspect or various possible designs of the first aspect are deployed.

According to a fourth aspect, this application provides a computer-readable storage medium. The computer-readable storage medium stores a computer-executable instruction. When an enable apparatus (which may be a BMC) in the physical device executes the computer-executable instruction, the enable apparatus executes the method for starting a physical device provided in the first aspect or various possible designs of the first aspect.

According to a fifth aspect, this application provides a computer program product. The computer program product includes a computer-executable instruction, where the computer-executable instruction is stored in a computer-readable storage medium. An enable apparatus (which may be a BMC) may read the computer-executable instruction from the computer-readable storage medium, and executes the computer-executable instruction in order to implement the method for starting a physical device provided in the first aspect or various possible designs of the first aspect.

DESCRIPTION OF EMBODIMENTS

The following describes the technical solutions in the embodiments of the present application with reference to the accompanying drawings in the embodiments of the present application.

Physical Device Embodiment

Figure 1A:
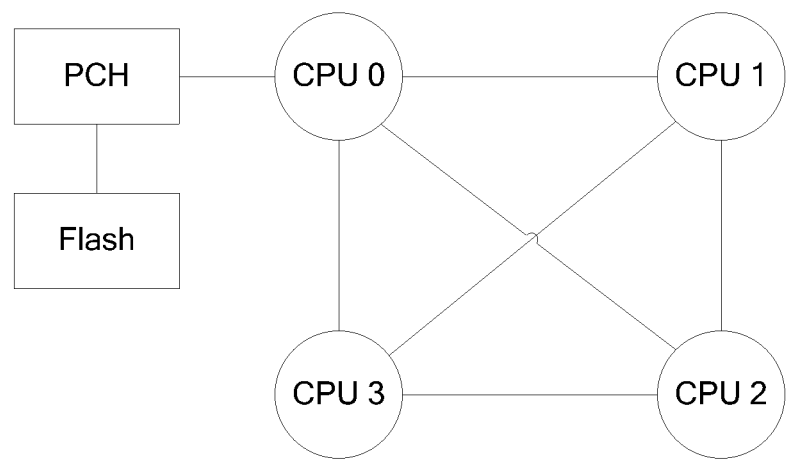
FIG. 1A is a schematic diagram of a systematic architecture of a physical device that includes four CPUs.
Figure 1B:
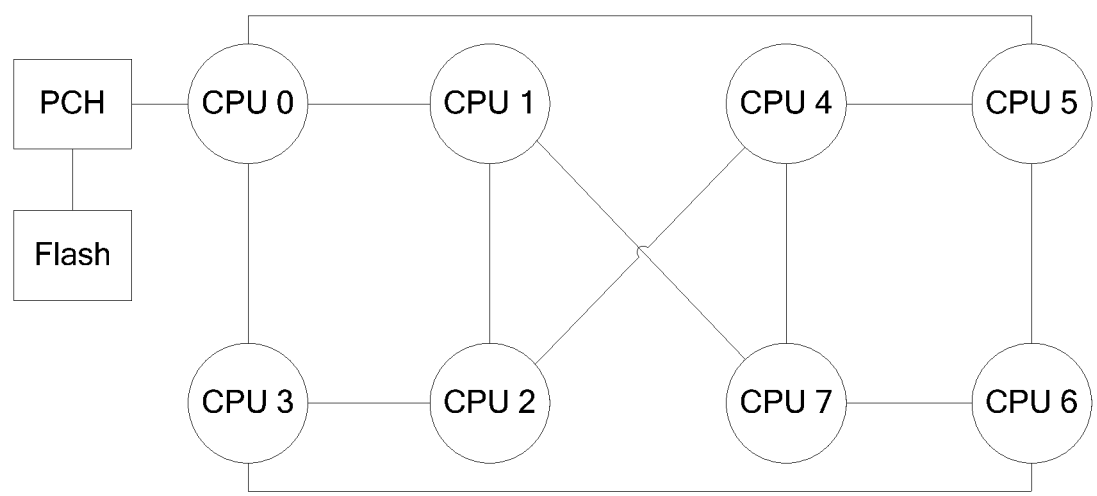
FIG. 1B is a schematic diagram of a systematic architecture of a physical device that includes eight CPUs.
Figure 2:
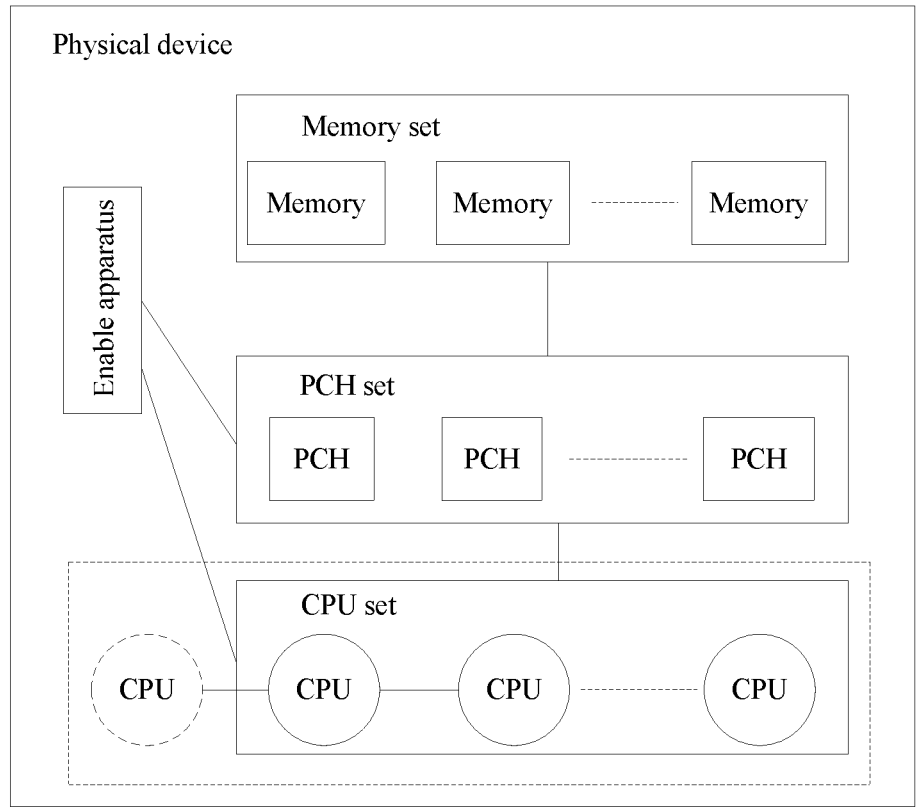
FIG. 2 is a schematic diagram of a systematic architecture of a physical device according to an embodiment of the present application.

Referring to FIG. 2, a physical device has a memory, a PCH, a CPU, and an enable apparatus.

The physical device has one or more memories, and the one or more memories in the physical device belong to a memory set in FIG. 2. The memory may be a non-volatile memory, for example, a flash memory. The memory stores a BIOS program required for starting the physical device. Optionally, different memories in the memory set may store a same BIOS program. In this way, each time the CPU starts the physical device, the CPU executes a same BIOS program to perform same configuration on the physical device. For example, the CPU performs same input/output configuration. Optionally, different memories in the memory set may also store different BIOS programs. When starting the physical device at different time, the CPU may execute the different BIOS programs in the different memories in order to perform different configuration on the physical device. For example, when starting the physical device at different time, the CPU performs different input/output configuration on the physical device.

The physical device has one or more PCHs, and the one or more PCHs in the physical device belong to a PCH set in FIG. 2. Any PCH in the PCH set is electrically connected to a memory in the memory set. For example, each PCH in the PCH set is connected to a different memory. For another example, each PCH in the PCH set is connected to a same memory. In this way, the CPU can read the BIOS program from the memory using the PCH, and executes the BIOS program to start the physical device.

The physical device has M CPUs, where M is a positive integer greater than or equal to 2.

In the M CPUs in the physical device, N CPUs belong to a CPU set in FIG. 2, where N is a positive integer greater than or equal to 2, and M is greater than or equal to N. Each CPU in the CPU set is electrically connected to one PCH in the PCH set. Different CPUs in the CPU set may be electrically connected to a same PCH, or may be electrically connected to different PCHs respectively. Because any CPU in the CPU set may directly access the PCH, any CPU in the CPU set may be selected as a primary CPU.

If M is equal to N, a CPU in a dashed box in FIG. 2 does not exist. In this case, all the M CPUs in the physical device belong to the CPU set, and all CPUs in the physical device are electrically connected to the PCH.

If M is greater than N, a CPU in a dashed box in FIG. 2 exists. The CPU in the dashed box is a CPU that is in the physical device and that is not electrically connected to the PCH. Therefore, the CPU in the dashed box does not belong to the CPU set (shown in FIG. 2), and the CPU cannot be selected as a primary CPU. In a process of starting the physical device, after the primary CPU establishes a communication connection to the CPU in the dashed box, the CPU in the dashed box can access the PCH using the primary CPU, then access the memory using the primary CPU and the PCH, and execute the BIOS program in the memory.

The M CPUs in the physical device are electrically connected with each other. Further, each of the M CPUs in the physical device is electrically connected to at least one other CPU. Optionally, each of the M CPUs in the physical device is electrically connected to at least two other CPUs. In this way, after a fault occurs in any one of the M CPUs, a CPU that is electrically connected to the CPU in which a fault occurs may further establish a communication connection to another CPU based on the electrical connection.

Optionally, the M CPUs are electrically connected using a cache coherence bus. The cache coherence bus may be a QPI bus, or may be an ultra path interconnect (UPI) bus.

The physical device has an enable apparatus. The enable apparatus is electrically connected to each CPU in the CPU set. The enable apparatus may send, to any CPU in the CPU set, an enable signal that is used to specify a primary CPU such that the CPU that receives the enable signal determines that the CPU is the primary CPU. It should be learned that the enable apparatus may further be electrically connected to another component that is in the physical device and that needs enable control such that the component determines a to-be-performed action according to configuration of the component after receiving an enable signal from the enable apparatus. For example, the enable apparatus is further electrically connected to the CPU in the dashed box in FIG. 2 (not shown in FIG. 2) such that the enable apparatus can send, to the CPU in the dashed box, an enable signal that is used to specify a secondary CPU.

The component in this embodiment of the present application includes a CPU, a PCH, a chip selector, a data selector, and the like.

The enable apparatus may be implemented using hardware, and further, may be implemented using a circuit.

The enable apparatus may also be implemented using software that runs on hardware and instructs the hardware to perform an action. In an optional implementation, the enable apparatus includes a BMC and a CPLD. The CPLD is electrically connected to a component that is in the physical device and that needs enable control, for example, a CPU in the CPU set. The BMC may indicate a component to which the CPLD sends an enable signal.

In this embodiment of the present application, two components in the physical device that are electrically connected may send an electrical signal to each other. For example, the enable apparatus is electrically connected to a CPU such that the enable apparatus can send an enable signal to the CPU. For another example, a CPU is electrically connected to a PCH such that when starting the physical device, the CPU can establish a communication connection to the PCH using an electrical signal in order to access a resource in the PCH. For another example, when two CPUs are electrically connected, the two CPUs may establish a communication connection to each other by exchanging electrical signals.

Two components that are communicatively connected may send data to each other. In this embodiment of the present application, a communication connection may be established based on an electrical connection. For example, two components that are connected using a bus (for example, two CPUs, or a CPU and a PCH) may establish a communication connection based on a protocol supported by the bus. After the communication connection is established, data may be sent to each other based on the protocol.

In the other approaches, only one CPU is connected to a PCH. Therefore, only the CPU can be used as the primary CPU to start the physical device. If a fault occurs in the CPU, starting of the physical device fails.

To resolve the foregoing problem, the embodiments of the present application provide the foregoing physical device. At least two CPUs in the physical device are electrically connected to a PCH, that is, each CPU in the CPU set is electrically connected to a PCH, which is shown in FIG. 2. On the basis of the physical device, the embodiments of the present application provide a method for starting the physical device, and the enable apparatus can execute the method to overcome the foregoing problem.

Method Embodiment

Figure 3:
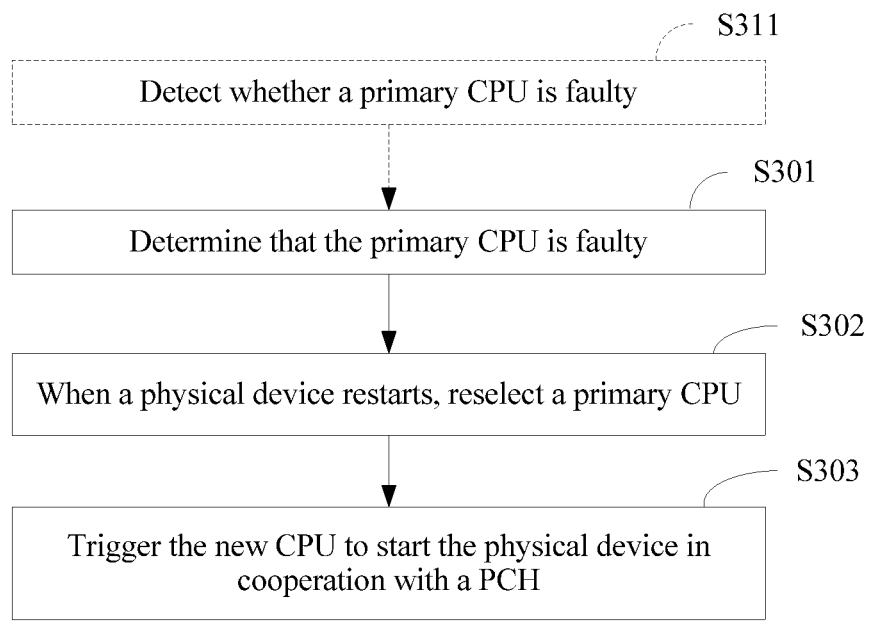
FIG. 3 is a schematic flowchart of a method for starting a physical device according to an embodiment of the present application.

This embodiment of the present application provides a method for starting a physical device. Referring to FIG. 3, the method includes steps S301, S302, and S303.

Optionally, when step S301 is performed, information representing whether a primary CPU is faulty needs to be obtained. The information may be obtained by means of detection by performing step S311.

Step S311: Detect whether a primary CPU is faulty.

Step S311 may be performed when the physical device is powered on to start, or may be performed after the physical device starts.

A fault that may occur in the primary CPU includes three types a first type of fault is an electrical fault, a second type of fault is a fault of a communication connection to another CPU, and a third type of fault is another possible fault.

For the first type of fault, the primary CPU feeds back the fault to an enable apparatus. When an electrical fault occurs, the primary CPU feeds back the fault to the enable apparatus using an electrical signal, and the enable apparatus determines, according to the electrical signal, that a fault occurs in the primary CPU. For example, when receiving the electrical signal, a CPLD in the enable apparatus identifies the fault that occurs in the primary CPU in a register of the CPLD, and a BMC in the enable apparatus determines, according to the identifier in the register, that the first type of fault occurs in the primary CPU.

The second type of fault is detected using the enable apparatus or a BIOS. A specific detection method may be determining whether there is a difference between a quantity of CPUs in the physical device that are powered on and a quantity of CPUs detected by the BIOS after power-on, and further determining whether the difference is caused by the second type of fault that occurs in the primary CPU. For example, when all CPUs in the physical device are powered on, the enable apparatus records a quantity of the CPUs that are powered on. The BIOS detects the CPUs after the CPUs are powered on, and records a quantity of detected CPUs. The BMC in the enable apparatus or the BIOS compares the quantity of the CPUs that are powered on with the quantity of the CPUs that are detected by the BIOS after power-on. If a comparison result is that the quantities are different, and an error code on a bus connected between the primary CPU and another CPU is obtained by means of querying, it may be determined according to the error code whether the second type of fault occurs in the primary CPU. If the BIOS determines, according to the error code, that the second type of fault occurs in the primary CPU, the BIOS further needs to notify the BMC that the second type of fault occurs in the primary CPU.

For the third type of fault, the primary CPU performs detection using a machine check architecture (MCA) mechanism. If the primary CPU detects, using the MCA mechanism, that the third type of fault occurs in the primary CPU, the primary CPU reports the third type of fault to the enable apparatus using the BIOS, or the primary CPU directly reports the third type of fault to the enable apparatus such that the enable apparatus determines that a fault occurs in the primary CPU. Reporting the third type of fault to the enable apparatus by the primary CPU may be further reporting the third type of fault to the BMC in the enable apparatus such that the BMC determines that a fault occurs in the primary CPU.

If step S311 is performed when the physical device is powered on to start, and no fault is detected in the primary CPU, the primary CPU continues to start the physical device.

Regardless of whether step S311 is performed when the physical device is powered on to start or after the physical device starts, when it is detected that a fault occurs in the primary CPU, the enable apparatus obtains a detection result of step S311. For example, for the first type of fault, the enable apparatus directly obtains an identifier, in the register of the CPLD, representing that the first type of fault occurs in the primary CPU. For example, for the second type of fault, the enable apparatus directly obtains an error code or receives notification from the BIOS. Content of the notification is that the second type of fault occurs in the primary CPU. For another example, for the third type of fault, the enable apparatus receives information that represents the third type of fault and that is reported by the primary CPU.

It should be learned that a detection result obtained by performing step S311 is a representation form of information representing whether the primary CPU is faulty.

It should be learned that step S311 is a possible implementation of step S301 of obtaining information representing whether the primary CPU is faulty, or step S311 may be replaced with another possible implementation of obtaining information representing whether the primary CPU is faulty. For example, a possible implementation of obtaining information representing whether the primary CPU is faulty provided in the other approaches is used.

Step S301: Determine that the primary CPU is faulty.

The enable apparatus obtains the information representing whether the primary CPU is faulty (for example, the detection result of step S311), and determines, according to the information representing whether the primary CPU is faulty, whether a fault occurs in the primary CPU. If the enable apparatus determines that a fault occurs in the primary CPU, the enable apparatus records an identifier of the primary CPU in which a fault occurs. The identifier of the primary CPU may be an identity (ID) of the primary CPU, or another characteristic that may be used to uniquely identify the CPU. If the enable apparatus includes a BMC, the BMC obtains the information representing whether the primary CPU is faulty, and determines whether a fault occurs in the primary CPU.

In this embodiment of the present application, a primary CPU that is determined to be faulty according to the information representing whether the primary CPU is faulty (for example, a detection result of step S311) is referred to as a first CPU. Therefore, the first CPU is a primary CPU configured to start the physical device before a fault occurs in the first CPU. It should be learned that the first CPU is a CPU in a CPU set.

Step S302: When the physical device restarts, reselect a primary CPU.

After step S301 of determining that the primary CPU is faulty, the physical device restarts. The physical device may be re-powered on to start, or the physical device may be restarted using a Ctrl-Alt-Delete key combination. When restarting the physical device, the enable apparatus selects, according to the recorded identifier of the primary CPU in which a fault occurs, a CPU in which no fault occurs from the CPU set as a new primary CPU. In this embodiment of the present application, the CPU that is in the CPU set and that functions as the new primary CPU is referred to as a second CPU.

In a possible implementation, the enable apparatus records only an identifier of a primary CPU in which a fault occurs most recently (that is, the identifier of the first CPU). The enable apparatus determines an alternative CPU set according to the recorded identifier of the primary CPU in which a fault occurs most recently. The alternative CPU set includes all CPUs in the CPU set except the first CPU. Further, in step S302, the enable apparatus selects a CPU (that is, the second CPU) from the alternative CPU set as the new primary CPU.

In a possible implementation, before step S302, the enable apparatus records an identifier of a faulty primary CPU (including the identifier of the first CPU) that is determined each time the physical device is started. The enable apparatus determines an alternative CPU set according to the recorded identifiers of all the faulty primary CPUs. The alternative CPU set includes all CPUs in the CPU set except all the faulty primary CPUs. Further, in step S302, the enable apparatus selects a CPU (that is, the second CPU) from the alternative CPU set as the new primary CPU.

It should be understood that step S302 in which the enable apparatus selects the second CPU from the alternative CPU set is classified into two implementation cases.

First case: If the alternative CPU set includes one CPU, the CPU is the second CPU.

Second case: If the alternative CPU set includes P CPUs, and P is a positive integer greater than 1, one CPU is determined from the P CPUs included in the alternative CPU set as the second CPU.

Optionally, for the second implementation case, the enable apparatus may determine any CPU from the alternative CPU set as the second CPU.

Optionally, for the second implementation case, the enable apparatus may select a CPU that imposes minimum impact on performance of the alternative CPU set as the second CPU.

In a possible implementation, minimum performance impact may mean that a sum of hop counts required for all CPUs in the physical device except the first CPU and the new primary CPU to connect to the new primary CPU using respective shortest paths is minimum. Therefore, a sum of hop counts required for all the CPUs in the physical device except the first CPU and the new primary CPU to access a PCH using the new primary CPU is minimum. The shortest path is a path determined using a shortest path algorithm, and the shortest path algorithm is not limited herein. It should be learned that if the physical device includes a CPU in a dashed box in FIG. 2, all the CPUs in the physical device except the first CPU and the new primary CPU include the CPU in the dashed box in FIG. 2, that is, include a CPU that is in the physical device and that is not electrically connected to any PCH.

If it is assumed that a fault occurs in only the first CPU in the CPU set of the physical device, an implementation in which the enable apparatus compares hop counts to determine the second CPU includes the following two steps.

First step: When all CPUs in the alternative CPU set successively function as a primary CPU, the enable apparatus calculates a sum of hop counts required for all CPUs in the physical device except the first CPU and the primary CPU to connect to the primary CPU using respective shortest paths.

The enable apparatus calculates a first hop count when a third CPU functions as the primary CPU. A calculation method for calculating the first hop count may be calculating a sum of hop counts required for all CPUs in the physical device except the first CPU and the third CPU to connect to the third CPU using respective shortest paths. The third CPU is a CPU in the alternative CPU set. The enable apparatus calculates a second hop count when a fourth CPU functions as the primary CPU. A calculation method for calculating the second hop count may be calculating a sum of hop counts required for all CPUs in the physical device except the first CPU and the fourth CPU to connect to the fourth CPU using respective shortest paths. The fourth CPU is any CPU that is in the alternative CPU set and that is different from the third CPU.

In an alternative solution of the first step of calculating the first hop count and calculating the second hop count, or in an example of a specific calculation method for calculating the first hop count and calculating the second hop count in the first step, the physical device has M CPUs, M is a positive integer greater than or equal to N, and the M CPUs includes the N CPUs. There are Q electrical connections between the M CPUs, Q is a positive integer, and further, any one of the M CPUs is electrically connected to at least one CPU of other CPUs of the M CPUs. A first topology includes M nodes and Q links, and the M CPUs are in a one-to-one correspondence with the M nodes, that is, each of the M CPUs is used as a node. The Q links are in a one-to-one correspondence with the Q electrical connections, that is, each electrical connection of the Q electrical connections is used as a link. The first hop count is further a sum of hop counts included in shortest paths using which all CPUs of the M CPUs except the first CPU and the third CPU connect to the third CPU according to the first topology. The second hop count is a sum of hop counts included in shortest paths using which all CPUs of the M CPUs except the first CPU and the fourth CPU connect to the fourth CPU according to the first topology.

Second step: If the first hop count is less than or equal to the second hop count, the enable apparatus uses the third CPU as the second CPU.

Optionally, if a fault occurs in only the first CPU in the CPU set of the physical device, the enable apparatus may directly perform the first step to calculate the first hop count and the second hop count. If a fault occurs not only on the first CPU in the CPU set of the physical device, because faulty CPUs are no longer used to start the physical device (do not access the PCH using the primary CPU), the enable apparatus ignores the faulty CPUs when calculating the first hop count and the second hop count.

In a possible implementation, the minimum performance impact is determined according to a topology of the alternative CPU set. Further, the enable apparatus selects a CPU that is in a central location of the topology of the CPU set as the primary CPU such that impact on the performance of the alternative CPU set is minimized.

For example, the alternative CPU set includes P CPUs, and the P CPUs are connected in series such that the P CPUs form a serial link. The serial link includes P nodes and P−1 sub-links. The P CPUs are in a one-to-one correspondence with the P nodes, that is, each of the P CPUs is used as a node. There are P−1 electrical connections between the P CPUs. Further, any one of the P CPUs is electrically connected to at least one CPU of other CPUs of the P CPUs. The P−1 electrical connections are in a one-to-one correspondence with the P−1 sub-links, that is, each electrical connection of the P−1 electrical connections is used as a sub-link. In a scenario in which the P CPUs form a serial link, the enable apparatus determines a CPU corresponding to an intermediate node in the serial link as the second CPU.

Optionally, if the enable apparatus includes a BMC, the BMC performs an action of selecting a new primary CPU in step S302. For example, the BMC selects the second CPU that imposes minimum impact on the performance of the alternative CPU set as the new primary CPU.

Step S303: Trigger the new CPU to start the physical device in cooperation with a PCH.

After determining the second CPU as the new primary CPU in step S302, the enable apparatus sends an enable signal to the second CPU in order to trigger the second CPU as the primary CPU and in cooperation with a first PCH to start the physical device.

Further, the enable apparatus sends the enable signal to the second CPU, and the enable signal indicates that the second CPU is the new primary CPU. For example, in step S302, the BMC in the enable apparatus determines the second CPU as the new primary CPU, and instructs the CPLD in the enable apparatus to send the enable signal to the second CPU. The second CPU receives the enable signal, and determines, according to an indication in the enable signal, that the second CPU is the new primary CPU.

After the second CPU determines that second CPU is the new primary CPU, the second CPU starts the physical device by functioning as the primary CPU and in cooperation with the first PCH. The first PCH is a PCH that is electrically connected to the second CPU.

A process of starting the physical device may include the following.

The second CPU functions as the primary CPU and obtains configuration information of a CPU topology from the first PCH. The configuration information in the PCH may include configuration information of CPUs and a bus protocol of a bus used to connect the CPUs. The second CPU configures all CPUs in the physical device except a faulty CPU according to the configuration information, and establishes communication connections between all the CPUs in the physical device except the faulty CPU in order to construct the CPU topology according to the configuration information.

All the CPUs in the physical device except the faulty CPU access a memory using the first PCH, and execute a BIOS program in the memory. Optionally, all CPUs in the physical device except the faulty CPU and the second CPU indirectly access the memory using the second CPU.

It should be learned that if the physical device includes the CPU in the dashed box in FIG. 2, all the CPUs in the physical device except the faulty CPU include the CPU in the dashed box in FIG. 2, that is, include the CPU that is in the physical device and that is not electrically connected to any PCH.

In an optional implementation, execution of steps S302 and S303 are triggered manually. For example, the physical device is manually powered on and restarted or is manually restarted using a Ctrl-Alt-Delete key combination, a component (for example, a trigger circuit including keys) is manually operated to select the second CPU as the primary CPU, and trigger the CPLD to send an enable signal to the second CPU.

In an optional implementation, the enable apparatus instructs the second CPU to configure itself to a local storage access mode, and instructs all the CPUs in the CPU set of the physical device except the faulty CPU and the second CPU to configure themselves to a remote storage access mode. For example, if the memory is a flash memory, the local storage access mode is a local flash mode, and the remote storage access mode is a remote flash mode.

In a possible implementation, after determining the second CPU as the new primary CPU in step S302, the enable apparatus determines a PCH that is electrically connected to the second CPU as a first PCH. The enable apparatus sends an enable signal to the first PCH, and the enable signal is used to instruct the first PCH to work such that the second CPU starts the physical device in cooperation with the first PCH. For example, in step S302, the BMC in the enable apparatus determines the second CPU as the new primary CPU, and controls the CPLD in the enable apparatus to send the enable signal to the first PCH. The enable signal may be used to enable the first PCH to release a reset state, and the first PCH that releases the reset state works.

In an optional implementation, if a PCH set has multiple PCHs, In a process in which the second CPU starts the physical device in cooperation with the first PCH, after the second CPU establishes the communication connections between all the CPUS in the CPU set of the physical device except the first CPU, all CPUs in the alternative CPU set except the second CPU perform configuration based on only a resource in the first PCH (for example, configure respective Peripheral Component Interconnect Express (PCI-e) buses connected to the CPUs).

In an optional implementation, if a PCH set has multiple PCHs, In a process in which the second CPU starts the physical device in cooperation with the first PCH, after the second CPU establishes the communication connections between all the CPUS in the CPU set of the physical device except the first CPU, all CPUs in the alternative CPU set except the second CPU may not only perform configuration based on a resource in the first PCH, but also perform configuration by accessing respective PCHs that are electrically connected to the CPUs (for example, configure respective PCI-e buses connected to the CPUs). Optionally, on the basis that all the CPUs in the alternative CPU set except the second CPU perform configuration based on the resource in the first PCH, the CPUs perform supplementary configuration using resources in the respective PCHs that are electrically connected to the CPUs.

In a possible implementation, after determining the second CPU as the new primary CPU in step S302, the enable apparatus forbids the first CPU to participate in starting of the physical device. In addition, the enable apparatus forbids another faulty CPU in the CPU set of the physical device to participate in the starting of the physical device.

In this optional manner, an implementation of forbidding a CPU to participate in starting of the physical device is not limited. For example, power-up for the CPU may be stopped, or a communication connection between the second CPU and the CPU may be disconnected. For another example, power-up for the CPU is stopped, and a communication connection between the second CPU and the CPU is disconnected. For another example, the CPU is set to invalid, and the CPU that is set to invalid is no longer used to start the physical device.

Figure 4A:
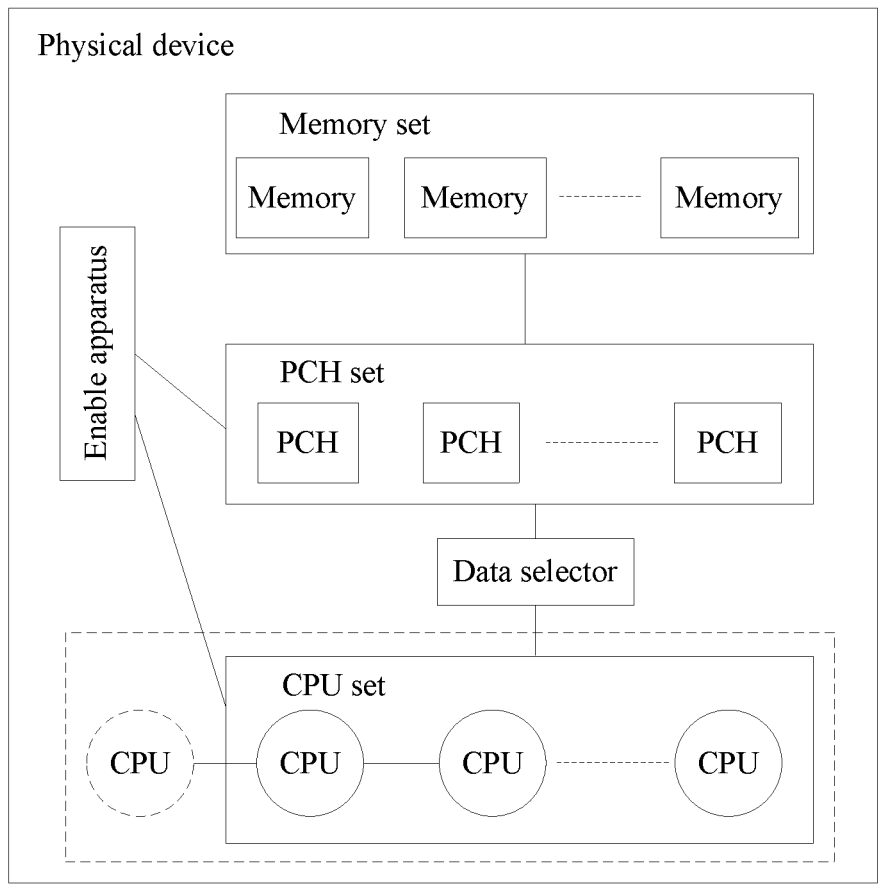
FIG. 4A is a schematic diagram of a systematic architecture of a physical device according to an embodiment of the present application.

In a possible implementation, referring to FIG. 4A, a data selector is added to the physical device shown in FIG. 2. The data selector may be any component that has a selecting function and that can establish a communication connection between a CPU and a PCH.

The data selector is electrically connected to each CPU in the alternative CPU set, and is further electrically connected to at least one PCH in the PCH set. The data selector is configured to select a CPU in the alternative CPU set, and is configured to select a PCH in the PCH set in order to establish a communication connection between the selected CPU and the selected PCH. Further, in this possible implementation, the data selector is configured to establish a communication connection between the second CPU and the first PCH according to an instruction of the enable apparatus.

In this embodiment of the present application, selecting means to establish a communication connection. For example, that the data selector selects a CPU further means that the data selector establishes a communication connection between the data selector and the CPU based on a bus protocol supported by a bus connected between the data selector and the CPU. Likewise, that the data selector selects a PCH means that the data selector establishes a communication connection between the data selector and the PCH based on a bus protocol supported by a bus connected between the data selector and the PCH.

Optionally, the PCH set has only one PCH, that is, has only the first PCH. In a scenario in which the PCH set has only the first PCH, there are multiple topologies in which the data selector is electrically connected between each CPU in the alternative CPU set and the first PCH, which are not limited therein. The following provides two possible topologies, and reference may be made to FIG. 4B and FIG. 4C.

Figure 4B:
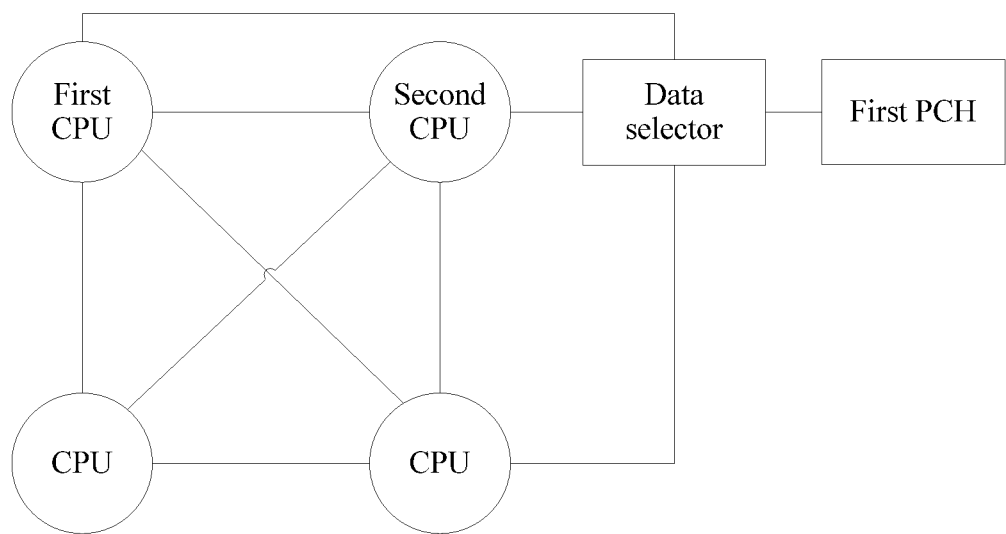
FIG. 4B is a topology diagram of four CPUs according to an embodiment of the present application.

FIG. 4B shows a topology in which four CPUs are used as an example. The four CPUs (including the first CPU and the second CPU) are electrically connected to each other, and the four CPUs and the first PCH are electrically connected to the data selector each. Optionally, the data selector in FIG. 4B may be a PCI-e switch. The PCI-e switch is electrically connected to each of the four CPUs using a direct media interface (DMI) bus. The enable apparatus may instruct the PCI-e switch to select a DMI bus that connects the first PCH to the second CPU in order to establish a communication connection between the second CPU and the first PCH.

Figure 4C:
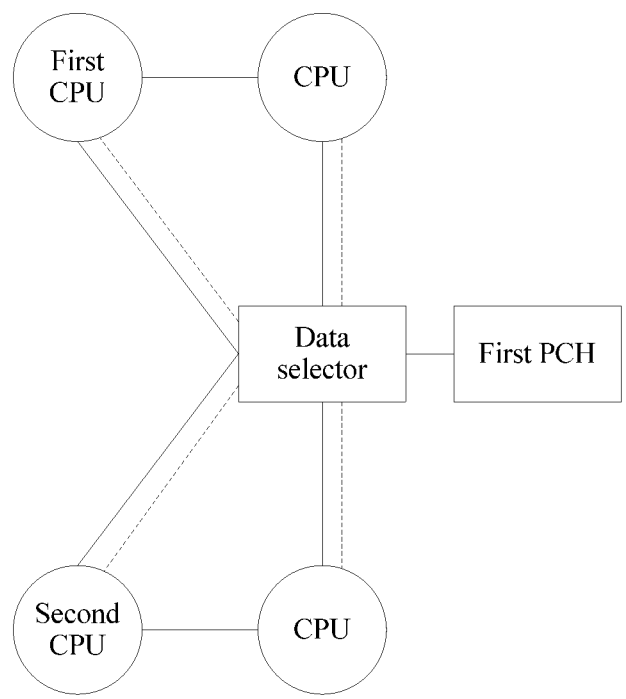
FIG. 4C is a topology diagram of four CPUs according to an embodiment of the present application.

FIG. 4C shows another topology in which four CPUs are used as an example. The four CPUs are communicatively connected to each other using the data selector, and the four CPUs may be directly connected to each other using a bus (for example, a QPI bus) or not connected to each other. For example, the first CPU is connected to a CPU using a bus, but the first CPU is not connected to the second CPU. In addition, the four CPUs and the first PCH are electrically connected to the data selector each. Optionally, the data selector in FIG. 4C may be a node controller (NC). The NC is electrically connected to each of the four CPUs using a bus. The enable apparatus may instruct the NC to select a bus that connects the first PCH to the second CPU in order to establish a communication connection between the second CPU and the first PCH.

In a scenario in which a data selector is added to the physical device, after determining that a fault occurs in the first CPU, when performing step S303 in FIG. 3, the enable apparatus instructs the data selector to establish the communication connection between the second CPU and the first PCH. Further, the enable apparatus sends, to the second CPU, the enable signal indicating that the second CPU is the new CPU, and sends, to the first PCH, the enable signal that is used to instruct the PCH to work, and further needs to send, to the data selector, an enable signal instructing to select the second CPU. The data selector establishes the communication connection between the second CPU and the first PCH according to the received enable signal such that the second CPU cooperates with the first PCH using the data selector in order to start the physical device.

Optionally, the data selector establishes communication connections to the second CPU and the first PCH based on a same bus protocol. In this way, regardless of whether in a physical device start phase or after the physical device starts, the data selector directly forwards data transmitted between the second CPU and the first PCH.

The topology of the four CPUs shown in FIG. 4B is used as an example for description, and it is assumed that the data selector is a PCI-e switch. The PCI-e switch and the second CPU are connected using a DMI bus, and the PCI-e switch and the first PCH are connected using a DMI bus. In this way, the PCI-e switch establishes a communication connection to each of the second CPU and the first PCH using a protocol supported by the DMI bus. After the communication connection is established, when forwarding data transmitted between the second CPU and first PCH, the PCI-e switch does not need to perform protocol conversion on the data.

The topology of the four CPUs shown in FIG. 4C is used as an example for description, and it is assumed that the data selector is an NC. The NC and the second CPU are not only connected using a QPI bus (a solid line connecting the NC and the second CPU shown in FIG. 4C), but also connected using a DMI bus (a dashed line connecting the NC and the second CPU shown in FIG. 4C), and the NC and the first PCH are connected using a DMI bus. In this way, the communication connections are established between the four CPUs using the NC based on a protocol supported by the QPI bus, and the NC establishes the communication connections between the four CPUs and the first PCH based on a protocol supported by the DMI bus. After the NC establishes the communication connections to the second CPU and the first PCH using the protocol supported by the DMI bus, when forwarding data transmitted between the second CPU and first PCH, the NC does not need to perform protocol conversion on the data.

Optionally, the data selector is communicatively connected to the second CPU based on a first bus protocol, and the data selector is communicatively connected to the first PCH based on a second bus protocol. The first bus protocol and the second bus protocol are different bus protocols. The first bus protocol is a bus protocol supported by a bus connected between the data selector and the second CPU. The second bus protocol is a bus protocol supported by a bus connected between the data selector and the first PCH. Regardless of whether in a physical device start phase or after the physical device starts, data transmitted between the second CPU and the first PCH needs to be converted and forwarded by the data selector.

When the data selector forwards data that is sent by the second CPU to the first PCH, the data selector converts the data that is received from the second CPU and that conforms to the first bus protocol into data that conforms to the second bus protocol, and sends the data that conforms to the second bus protocol to the first PCH.

When the data selector forwards data that is sent by the first PCH to the second CPU, the data selector converts the data that is received from the first PCH and that conforms to the second bus protocol into data that conforms to the first bus protocol, and sends the data that conforms to the first bus protocol to the second CPU.

The topology of the four CPUs shown in FIG. 4B is used as an example for description, and it is assumed that the data selector is an NC. If no dashed line connected between the NC and the second CPU exists in FIG. 4C, the NC and the second CPU are connected using a QPI bus (the solid line connected between the NC and the second CPU shown in FIG. 4C), and the NC and the first PCH are connected using a DMI bus. In this case, communication connections between the four CPUs and the NC are based on the protocol supported by the QPI bus, and the communication connection between the NC and the first PCH is based on the protocol supported by the DMI bus. When forwarding data that is sent by the second CPU to the first PCH, the NC needs to convert the data that conforms to the protocol supported by the QPI bus into data that conforms to the protocol supported by the DMI bus, and then forwards, to the first PCH, the data that undergoes protocol conversion. When forwarding data that is sent by the first PCH to the second CPU, the NC needs to convert the data that conforms to the protocol supported by the DMI bus into data that conforms to the protocol supported by the QPI bus, and then forwards, to the second CPU, the data that undergoes protocol conversion.

Figure 5:
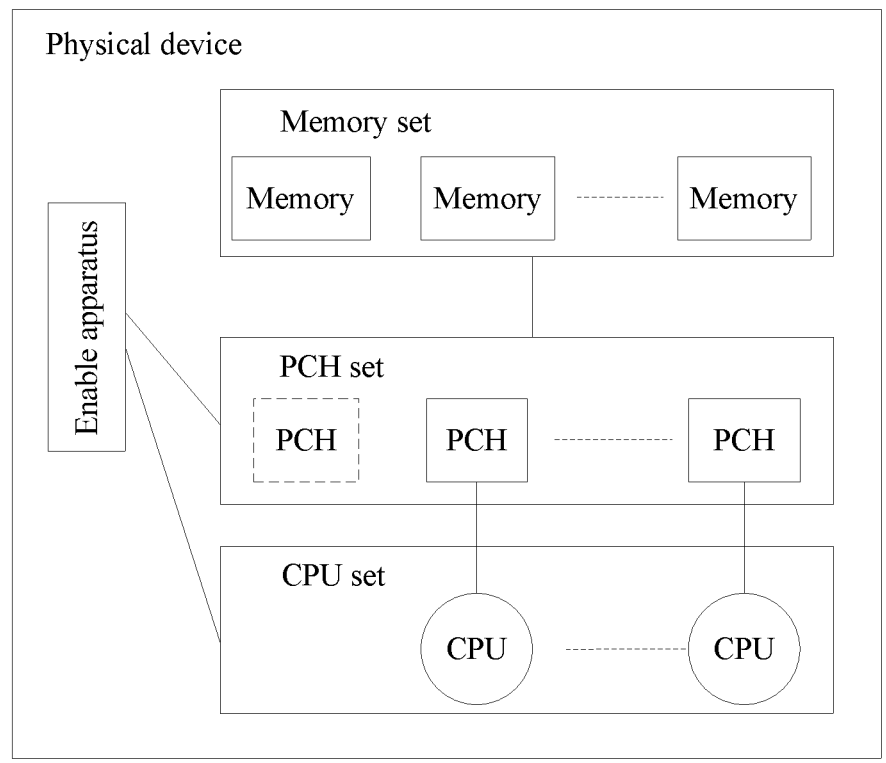
FIG. 5 is a schematic diagram of a systematic architecture of a physical device according to an embodiment of the present application.

In a possible implementation, referring to FIG. 5, a CPU set has N CPUs, a PCH set has J PCHs, and both J and N are positive integers greater than or equal to 2. In FIG. 5, all PCHs in the PCH set are electrically connected to memories in a memory set.

If J is equal to N, a PCH in a dashed box in FIG. 5 does not exist. The N CPUs in the CPU set are electrically connected to the J PCHs in the PCH set on a one-to-one basis, and the second CPU is electrically connected to the first PCH. In this way, each CPU exclusively occupies one PCH.

If J is greater than N, a PCH in a dashed box in FIG. 5 exists. FIG. 5 shows only one PCH using dashed lines. The N CPUs in the CPU set are electrically connected to N PCHs in the PCH set on a one-to-one basis, and the second CPU is electrically connected to the first PCH. CPUs in the PCH set except the N PCHs may not be electrically connected to any CPU in the CPU set, and therefore may be used as alternative PCHs.

Each of the N CPUs in the CPU set is connected to one PCH. If a fault occurs in one or more PCHs, the enable apparatus may determine a CPU and a PCH that are not faulty and that are electrically connected as the second CPU and the first PCH. It can be learned that when the enable apparatus determines a second CPU and a first PCH, the second CPU is selected from a set of alternative CPUs in which no fault occurs, the first PCH is selected from PCHs in which no fault occurs, and the second CPU and the first PCH are electrically connected. Optionally, the enable apparatus records an identifier of a faulty PCH, for example, an ID of the PCH.

Figure 6:
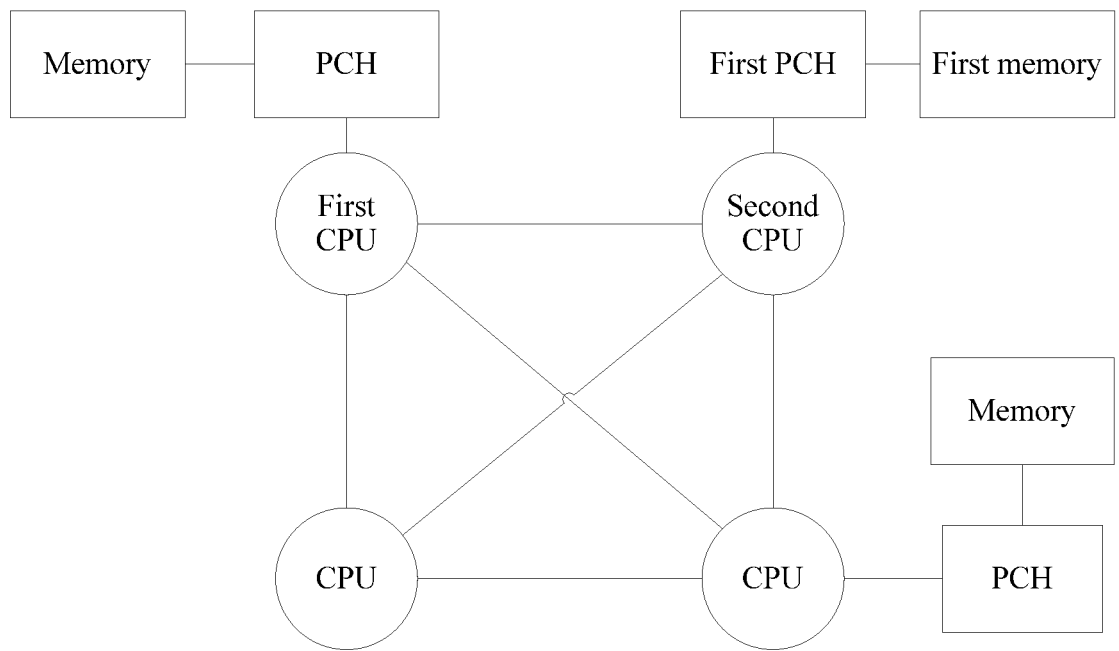
FIG. 6 is a topology diagram of four CPUs according to an embodiment of the present application.

Optionally, the memory set has J memories. That is, a quantity of memories included in the memory set is the same as a quantity of the PCHs included in the PCH set. The J memories in the memory set are electrically connected to the J PCHs in the PCH set on a one-to-one basis. The first PCH is electrically connected to one memory, and the memory is referred to as a first memory. For example, in an architecture of four CPUs shown in FIG. 6, J is equal to 3, and each of the three PCHs is electrically connected to one memory. It should be learned that, a communication connection may be established between a PCH and a memory that are electrically connected. After the communication connection is established, the PCH may access data in the memory, for example, a BIOS program.

Optionally, a PCH and a memory are electrically connected. For example, the same is true of an architecture of four CPUs shown in FIG. 6. The electrical connection between the PCH and the memory may be further implemented using a bus. For example, the bus may be a serial peripheral interface (SPI) bus. The PCH may establish the communication connection using a bus that is connected to the memory.

Figure 7A:
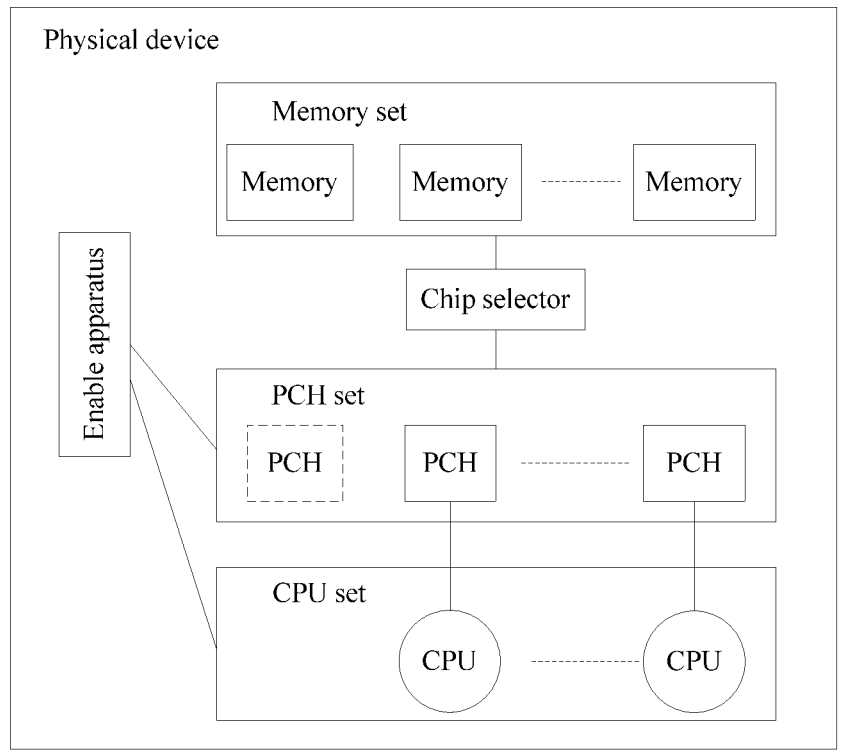
FIG. 7A is a schematic diagram of a systematic architecture of a physical device according to an embodiment of the present application.
Figure 7B:
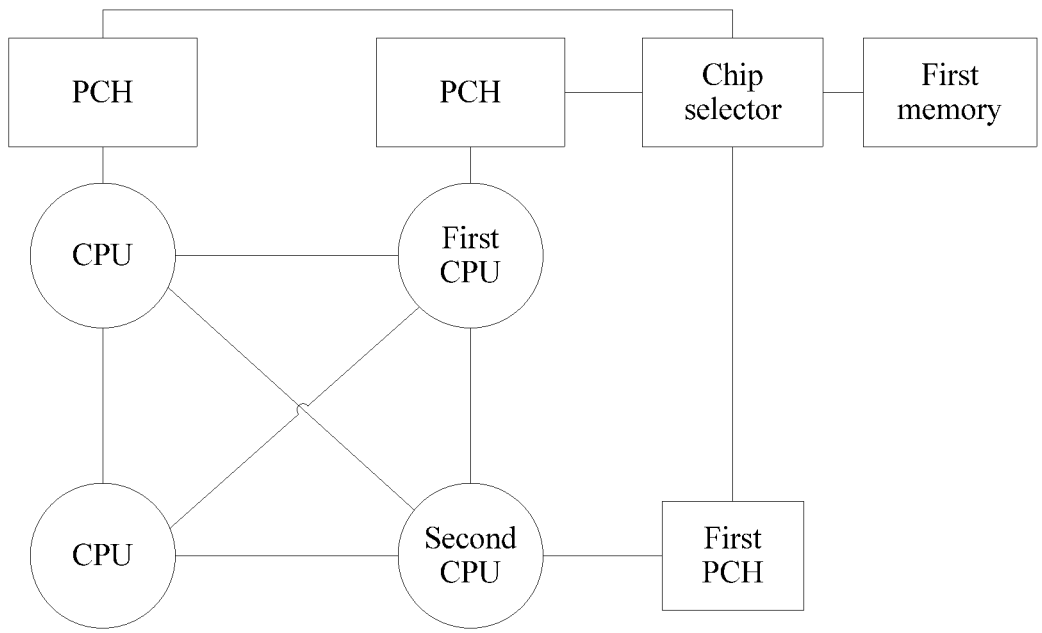
FIG. 7B is a topology diagram of four CPUs of a physical device according to an embodiment of the present application.

Optionally, referring to FIG. 7A, on the basis of the physical device shown in FIG. 5, the physical device further includes a chip selector. The chip selector is electrically connected to the J PCHs in the PCH set, and is further electrically connected to memories in the memory set. The electrical connection between the chip selector and the PCH, and the electrical connection between the chip selector and the memory may be implemented using a bus. For example, the bus may be a SPI bus. The PCH may establish a communication connection to the memory based on a protocol supported by the bus. For example, in an architecture of four CPUs shown in FIG. 7B, J is equal to 3. FIG. 7B shows only one memory.

The chip selector is configured to select any PCH in the J PCHs, and the selected PCH may access the memory using the chip selector. If the chip selector is electrically connected to one memory, the chip selector selects the memory that is electrically connected to the chip selector. If the chip selector is electrically connected to multiple memories, the chip selector is configured to select any memory in the memory set. It should be learned that the selected PCH and the selected memory are electrically connected using the chip selector. In this way, the selected PCH may establish a communication connection to the selected memory using the chip selector.

In a scenario in which a chip selector is added to the physical device, after the enable apparatus determines that a fault occurs in the first CPU, when performing step S303 in FIG. 3, the enable apparatus instructs the chip selector to establish an electrical connection between the first PCH and the first memory. The chip selector may select the first PCH and the first memory according to the instruction of the enable apparatus in order to establish the electrical connection between the first PCH and the first memory. For example, the BMC in the enable apparatus controls the CPLD in the enable apparatus to send an enable signal to the chip selector. The enable signal is used to instruct the chip selector to select the first PCH and the first memory.

After the electrical connection between the first PCH and the first memory is established, the first PCH establishes a communication connection to the first memory using the chip selector. After the first PCH establishes the communication connection to the first memory, the first PCH may directly access the first memory. After the first PCH establishes the communication connection to the first memory, the second CPU may access the first memory using the first PCH in order to execute a BIOS program in the first memory.

It should be learned that there may one or more chip selectors. If there are multiple chip selectors, the multiple chip selectors are respectively responsible for selecting different PCHs, and may further be respectively responsible for selecting memories.

Figure 8:
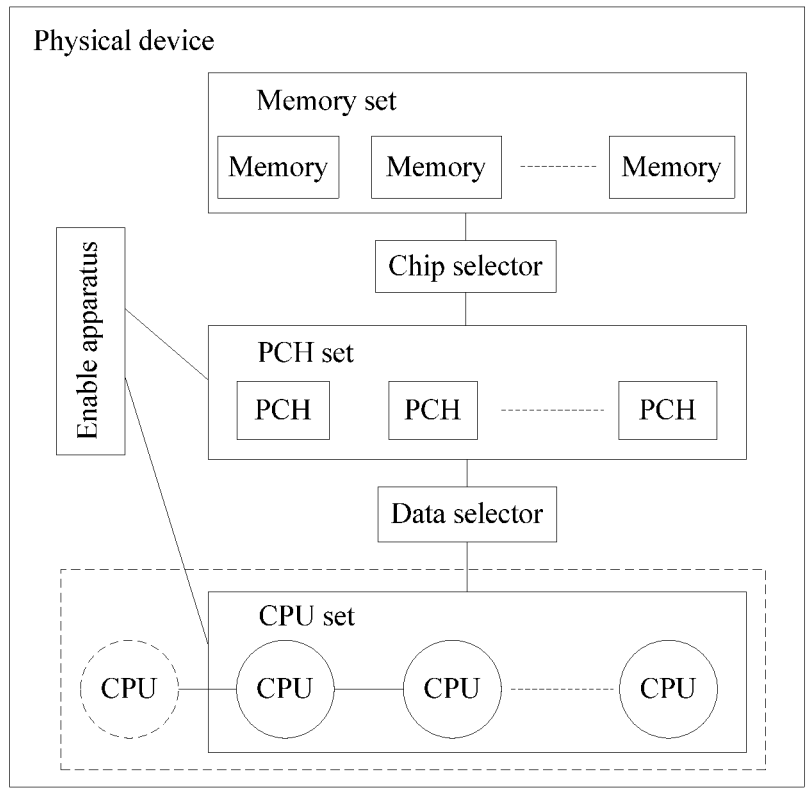
FIG. 8 is a schematic diagram of a systematic architecture of a physical device according to an embodiment of the present application.

In a possible implementation, referring to FIG. 8, on the basis of the physical device shown in FIG. 2, the physical device further includes a data selector and a chip selector. The data selector is configured to select any CPU in the CPU set, and is further configured to select a PCH corresponding to the selected CPU such that the CPU establishes a communication connection to the PCH using the data selector. The chip selector is configured to select any PCH in the PCH set, and is further configured to select a memory corresponding to the selected PCH such that the PCH establishes a communication connection to the memory using the chip selector. In this implementation, if the data selector selects the second CPH, the data selector and the chip selector select a same PCH, that is, the first PCH. In this way, the second CPU can access the memory using the first PCH in order to execute the BIOS program in the memory. In addition, for specific implementations of the data selector and the chip selector, and working principles of the data selector and the chip selector in this embodiment of the present application, refer to the foregoing description of the data selector in FIG. 4A and the foregoing description of the chip selector in FIG. 7A respectively, and details are not described herein again.

APPARATUS EMBODIMENTS

Apparatus Embodiment 1

Figure 9:
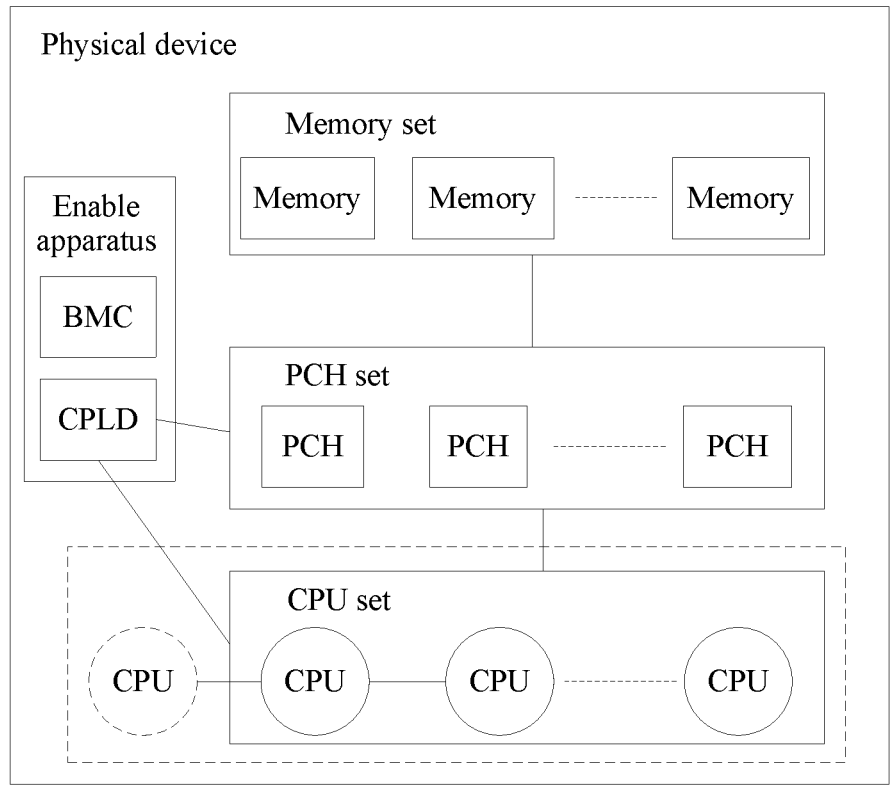
FIG. 9 is a schematic diagram of a systematic architecture of a physical device according to an embodiment of the present application.

This embodiment of the present application provides an enable apparatus for starting a physical device. Referring to FIG. 9, the enable apparatus includes a BMC and a CPLD.

The foregoing method for starting a physical device provided in the foregoing method embodiment may further be executed by the BMC in the enable apparatus. For example, the BMS executes step S311 to detect whether a primary CPU is faulty, executes step S301 to determine that the primary CPU is faulty, executes step S302 to select a new primary CPU after the physical device restarts, and executes step S303 to trigger the new CPU to start the physical device in cooperation with a PCH.

A specific implementation of step S303 in which the BMC triggers the new CPU to start the physical device in cooperation with the PCH may be as follows. After determining the new primary CPU in step S302, the enable apparatus instructs the CPLD to send an enable signal to the new CPU, and the CPU that receives the enable signal determines, according to the enable signal, that the CPU is the primary CPU, and starts the physical device by functioning as the primary CPU and in cooperation with a first PCH.

Optionally, when the BMC needs to trigger a component in the physical device, the BMC may control the CPLD to send an enable signal to the component in order to instruct, using different enable signals, different components to work.

For example, after determining a second CPU as the new primary CPU, the BMC may control the CPLD to send, to the second CPU, an enable signal indicating that the second CPU is the primary CPU.

For example, after determining the first PCH (a PCH that is electrically connected to the second CPU), the BMC may control the CPLD to send, to the first PCH, an enable signal that is used to instruct the first PCH to work.

For example, the BMC may control the CPLD to send an enable signal to a data selector, and instruct, using the enable signal, the data selector to select the second CPU and the first PCH.

For example, the BMC may control the CPLD to send an enable signal to a chip selector, and instruct, using the enable signal, the chip selector to establish an electrical connection between the first PCH and a first memory.

In addition, the BMC may further update a BIOS program in a memory, or write different BIOS programs to different memories.

It should be learned that, for details of a specific implementation in which the BMC cooperates with the CPLD to execute the method for starting a physical device provided in the foregoing method embodiment, refer to corresponding description in the foregoing method embodiment, and the details are not described herein again.

Apparatus Embodiment 2

This embodiment of the present application provides an enable apparatus for starting a physical device. The enable apparatus deploys functional units that are configured to execute the method for starting a physical device provided in the foregoing method embodiment. A division manner of the functional units is not limited herein.

Figure 10:
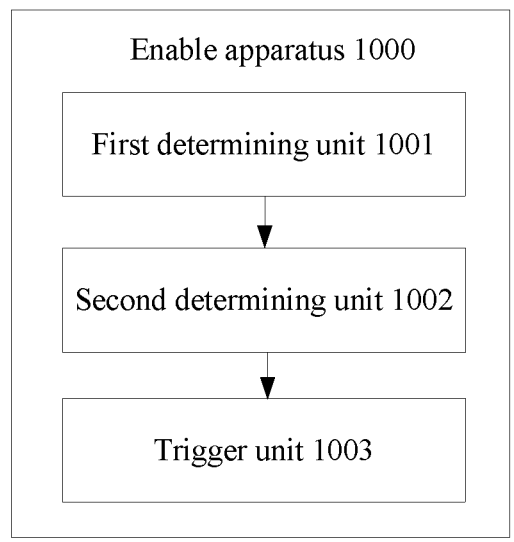
FIG. 10 is a schematic diagram of a logical structure of an enable apparatus according to an embodiment of the present application.

A physical device to which the enable apparatus is applicable is the same as that described in the foregoing physical device embodiment and the foregoing method embodiment. The physical device includes N CPUs and at least one PCH, where N is a positive integer greater than or equal to 2. Each of the N CPUs is electrically connected to the at least one PCH. Based on the physical device, an example of functional unit division corresponding to the method for starting a physical device provided in the foregoing method embodiment is provided. Referring to FIG. 10, the enable apparatus 1000 includes a first determining unit 1001, a second determining unit 1002, and a trigger unit 1003.

Further, the first determining unit 1001 is configured to determine that a fault occurs in a first CPU, where the first CPU is one of the N CPUs, and the first CPU is a primary CPU that is configured to start the physical device before a fault occurs in the first CPU.

The second determining unit 1002 is configured to determine a second CPU of the N CPUs as the primary CPU after the first determining unit 1001 determines that a fault occurs in the first CPU.

The trigger unit 1003 is configured to trigger the second CPU as the primary CPU and in cooperation with a first PCH to start the physical device after the second determining unit 1002 determines the second CPU as the primary CPU, where the first PCH is electrically connected to the second CPU, and the first PCH is one of the at least one PCH.

Optionally, an alternative CPU set includes all CPUs in the N CPUs except the first CPU.

The second determining unit 1002 is configured to determine that the CPU in the alternative CPU set is the second CPU if the alternative CPU set includes one CPU, or determine, from the P CPUs included in the alternative CPU set, one CPU as the second CPU if the alternative CPU set includes P CPUs, where P is a positive integer greater than 1.

Optionally, the second determining unit 1002 is configured to determine that a third CPU is the second CPU if a first hop count is less than or equal to a second hop count.

The physical device has M CPUs, M is a positive integer greater than or equal to N, and the M CPUs include the N CPUs. There are Q electrical connections between the M CPUs, Q is a positive integer, and any one of the M CPUs is electrically connected to at least one CPU of other CPUs of the M CPUs. A first topology includes M nodes and Q links, the M CPUs are in a one-to-one correspondence with the M nodes, the Q links are in a one-to-one correspondence with the Q electrical connections. The first hop count is a sum of hop counts included in shortest paths using which all CPUs of the M CPUs except the first CPU and the third CPU connect to the third CPU according to the first topology. The second hop count is a sum of hop counts included in shortest paths using which all CPUs of the M CPUs except the first CPU and a fourth CPU connect to the fourth CPU according to the first topology. The fourth CPU is any one of the P CPUs included in the alternative CPU set except the third CPU.

Optionally, the second determining unit 1002 is configured to determine a CPU corresponding to an intermediate node in the serial link as the second CPU if the P CPUs in the alternative CPU set form a serial link, where the serial link includes P nodes and P−1 sub-links, the P CPUs are in a one-to-one correspondence with the P nodes, there are P−1 electrical connections between the P CPUs, any one of the P CPUs is electrically connected to at least one CPU of other CPUs of the P CPUs, and the P−1 electrical connections are in a one-to-one correspondence with the P−1 sub-links.

Optionally, the trigger unit 1003 is configured to forbid the first CPU to participate in starting of the physical device after it is determined that a fault occurs in the first CPU.

Optionally, the physical device includes a first memory, and the first memory stores a BIOS program used for starting the physical device.

That the second CPU starts the physical device in cooperation with the first PCH includes accessing, by the second CPU, the first memory using the first PCH in order to execute the BIOS program.

Optionally, the physical device further includes a data selector, the data selector is electrically connected to each of the N CPUs, and the data selector is electrically connected to the first PCH.

The trigger unit 1003 is configured to instruct the data selector to establish a communication connection between the second CPU and the first PCH before triggering the second CPU as the primary CPU and in cooperation with the first PCH to start the physical device.

Optionally, the data selector is communicatively connected to the second CPU based on a first bus protocol, and the data selector is communicatively connected to the first PCH based on a second bus protocol.

The data selector is configured to convert data that is received from the second CPU and that conforms to the first bus protocol into data that conforms to the second bus protocol, and send the data that conforms to the second bus protocol to the first PCH, or convert data that is received from the first PCH and that conforms to the second bus protocol into data that conforms to the first bus protocol, and send the data that conforms to the first bus protocol to the second CPU.

Optionally, the at least one PCH is N PCHs, there are N electrical connections between the N CPUs and the N PCHs, the N CPUs are in a one-to-one correspondence with the N PCHs, and the second CPU is electrically connected to the first PCH.

Optionally, the physical device includes N memories, there are N electrical connections between the N memories and the N PCHs, the N memories are in a one-to-one correspondence with the N PCHs, and the first memory is a memory that is of the N memories and that is connected to the first PCH.

Optionally, the at least one PCH includes multiple PCHs, the physical device includes a chip selector, the chip selector is electrically connected to the multiple PCHs, and the chip selector is electrically connected to the memory.

The trigger unit 1003 is configured to instruct the chip selector to establish an electrical connection between the first PCH and the first memory before triggering the second CPU as the primary CPU and in cooperation with the first PCH to start the physical device.

Optionally, the functional units provided in Apparatus Embodiment 2 may be further deployed in a BMC in the enable apparatus. Similar to Apparatus Embodiment 1, when the functional units deployed in the BMC need to trigger a component in the physical device, the functional units may control a CPLD to send an enable signal to the component in order to instruct, using different enable signals, different components to work.

Apparatus Embodiment 3

This embodiment of the present application provides an enable apparatus for starting a physical device. The enable apparatus includes a CPLD and another component. When a user knows which CPUs are faulty, the user may operate the component (for example, a trigger circuit including keys) manually to trigger the CPLD to send an enable signal to a second CPU.

Optionally, the user may obtain an ID of a faulty CPU from a BMC in order to know which CPUs are faulty.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for starting a physical device, comprising:
   detecting that a fault occurs in a first central processing unit (CPU) by an enable apparatus, wherein the enable apparatus is communicatively coupled to at least one platform control hub (PCH) and N CPUs, wherein the N is a positive integer greater than or equal to two, and wherein the N CPUs comprise the first CPU and a second CPU;
   determining the second CPU in the N CPUs as a primary CPU when the fault occurs in the first CPU in the N CPUs, wherein the physical device comprises the N CPUs and the at least one PCH, wherein the first CPU is the primary CPU configured to start the physical device before the fault occurs in the first CPU, wherein an alternative CPU set comprises all CPUs of the N CPUs except the first CPU, and wherein determining the second CPU as the primary CPU comprises:
   determining only one CPU in the alternative CPU set as the second CPU when the alternative CPU set comprises the only one CPU; and
   determining, from P CPUs comprised in the alternative CPU set, one CPU as the second CPU when the alternative CPU set comprises the P CPUs, wherein the P is a positive integer greater than one, wherein determining, from the P CPUs comprised in the alternative CPU set, the one CPU as the second CPU comprises determining a CPU corresponding to an intermediate node in a serial link as the second CPU when the P CPUs in the alternative CPU set form the serial link, wherein the serial link comprises P nodes and P−1 sub-links, wherein the P CPUs are in a one-to-one correspondence with the P nodes, wherein the physical device further comprises P−1 electrical couplings among the P CPUs, wherein any one of the P CPUs are electrically coupled to at least one CPU of other CPUs of the P CPUs, and wherein the P−1 electrical couplings are in a one-to-one correspondence with the P−1 sub-links; and
   sending an enable signal from the enable apparatus to the second CPU to trigger the second CPU as the primary CPU to, in cooperation with a first PCH, start the physical device, wherein the first PCH is electrically coupled to the second CPU, and wherein the first PCH is one of the at least one PCH.

2. The method of claim 1, further comprising forbidding the first CPU to participate in starting of the physical device when the fault occurs in the first CPU.

3. The method of claim 1, wherein the physical device comprises a first memory storing a basic input/output system (BIOS) program used for starting the physical device, and wherein starting the physical device in cooperation with the first PCH comprises accessing, by the second CPU, the first memory using the first PCH in order to execute the BIOS program.

4. The method of claim 3, wherein the at least one PCH comprises a plurality of PCHs, wherein the physical device further comprises a chip selector electrically coupled to the PCHs and the first memory, and wherein before sending the enable signal from the enable apparatus to the second CPU to trigger the second CPU to start the physical device, the method further comprises instructing the chip selector to establish an electrical coupling between the first PCH and the first memory.

5. The method of claim 1, wherein the physical device further comprises a data selector electrically coupled to each of the N CPUs and the first PCH, and wherein before sending the enable signal from the enable apparatus to the second CPU to trigger the second CPU to start the physical device, the method further comprises instructing the data selector to establish a communication coupling between the second CPU and the first PCH.

6. The method of claim 5, wherein the data selector is communicatively coupled to the second CPU based on a first bus protocol and to the first PCH based on a second bus protocol and configured to:
   convert data received from the second CPU and conforming to the first bus protocol into data conforming to the second bus protocol, and send the data conforming to the second bus protocol to the first PCH; or convert data received from the first PCH and conforming to the second bus protocol into data conforming to the first bus protocol, and send the data conforming to the first bus protocol to the second CPU.

7. The method of claim 5, wherein the data selector is communicatively coupled to the second CPU based on a first bus protocol and to the first PCH based on a second bus protocol and configured to:
  convert data received from the second CPU and conforming to the first bus protocol into data conforming to the second bus protocol; and
  send the data conforming to the second bus protocol to the first PCH.

8. The method of claim 5, wherein the data selector is communicatively coupled to the second CPU based on a first bus protocol and to the first PCH based on a second bus protocol and configured to:
  convert data received from the first PCH and conforming to the second bus protocol into data conforming to the first bus protocol; and
  send the data conforming to the first bus protocol to the second CPU.

9. The method of claim 1, wherein the at least one PCH comprises N PCHs, wherein the physical device further comprises N electrical couplings among the N CPUs and the N PCHs, wherein the N CPUs are in a one-to-one correspondence with the N PCHs, and wherein the second CPU is electrically coupled to the first PCH.

10. The method of claim 9, wherein the physical device further comprises N memories and N electrical couplings among the N memories and the N PCHs, wherein the N memories are in a one-to-one correspondence with the N PCHs, and wherein the first memory is a memory of the N memories coupled to the first PCH.

11. The method of claim 1, wherein the physical device comprises a server.

12. An enable apparatus for starting a physical device, comprising:
  a non-transitory memory comprising instructions; and
  a processor coupled to the non-transitory memory, wherein the instructions cause the processor to be configured to:
    detect that a fault occurs in a first central processing unit (CPU) by the enable apparatus, wherein the enable apparatus is communicatively coupled to at least one platform control hub (PCH) and N CPUs, wherein the N is a positive integer greater than or equal to two, and wherein the N CPUs comprise the first CPU and a second CPU;
    determine the second CPU in the N CPUs as a primary CPU when the fault occurs in the first CPU in the N CPUs, wherein the physical device comprises the N CPUs and the at least one PCH, wherein the first CPU is the primary CPU configured to start the physical device before the fault occurs in the first CPU, wherein an alternative CPU set comprises all CPUs of the N CPUs except the first CPU, and wherein the instructions further cause the processor to be configured to:
      determine that only one CPU in the alternative CPU set is the second CPU when the alternative CPU set comprises the only one CPU; and
      determine, from P CPUs comprised in the alternative CPU set, one CPU as the second CPU when the alternative CPU set comprises the P CPUs, wherein the P is a positive integer greater than one, wherein the instructions further cause the processor to be configured to determine a CPU corresponding to an intermediate node in a serial link as the second CPU when the P CPUs in the alternative CPU set form the serial link, wherein the serial link comprises P nodes and P-1 sub-links, wherein the P CPUs are in a one-to-one correspondence with the P nodes, wherein the physical device further comprises P-1 electrical couplings among the P CPUs, wherein any one of the P CPUs is electrically coupled to at least one CPU of other CPUs of the P CPUs, and wherein the P-1 electrical couplings are in a one-to-one correspondence with the P-1 sub-links; and
    send an enable signal from the enable apparatus to the second CPU to trigger the second CPU as the primary CPU to, in cooperation with a first PCH, start the physical device, wherein the first PCH is electrically coupled to the second CPU, and wherein the first PCH is one of the at least one PCH.

13. The enable apparatus of claim 12, wherein the instructions further cause the processor to be configured to forbid the first CPU to participate in starting of the physical device when the fault occurs in the first CPU.

14. The enable apparatus of claim 12, wherein the physical device further comprises a first memory, wherein the first memory stores a basic input/output system (BIOS) program used for starting the physical device, and wherein when starting the physical device in cooperation with the first PCH, the instructions further cause the processor to be configured to access, by the second CPU, the first memory using the first PCH in order to execute the BIOS program.

15. The enable apparatus of claim 12, wherein the physical device further comprises a data selector, wherein the data selector is electrically coupled to each of the N CPUs and the first PCH, and wherein before triggering the second CPU to start the physical device, the instructions further cause the processor to be configured to instruct the data selector to establish a communication coupling between the second CPU and the first PCH.

16. The enable apparatus of claim 15, wherein the data selector is communicatively coupled to the second CPU based on a first bus protocol and to the first PCH based on a second bus protocol, and wherein the instructions further cause the processor to be configured to:
  convert data received from the second CPU and conforming to the first bus protocol into data conforming to the second bus protocol, and send the data conforming to the second bus protocol to the first PCH; or
  convert data received from the first PCH and conforming to the second bus protocol into data conforming to the first bus protocol, and send the data conforming to the first bus protocol to the second CPU.

17. The enable apparatus of claim 15, wherein the data selector is communicatively coupled to the second CPU based on a first bus protocol and to the first PCH based on a second bus protocol, and wherein the instructions further cause the processor to be configured to:
  convert data received from the second CPU and conforming to the first bus protocol into data conforming to the second bus protocol; and
  send the data conforming to the second bus protocol to the first PCH.

18. The enable apparatus of claim 15, wherein the data selector is communicatively coupled to the second CPU based on a first bus protocol and to the first PCH based on a second bus protocol, and wherein the instructions further cause the processor to be configured to:

convert data received from the first PCH and conforming to the second bus protocol into data conforming to the first bus protocol; and send the data conforming to the first bus protocol to the second CPU.

19. The enable apparatus of claim 12, wherein the at least one PCH comprises N PCHs, wherein the physical device further comprises N electrical couplings among the N CPUs and the N PCHs, wherein the N CPUs are in a one-to-one correspondence with the N PCHs, and wherein the second CPU is electrically coupled to the first PCH.

20. The enable apparatus of claim 12, wherein the physical device comprises a server.

* * * * *